United States Patent
Koinzan

[11] 3,843,058
[45] Oct. 22, 1974

[54] DIRECTION CONTROL SYSTEM WITH LEVER VALVE CONTROL

[76] Inventor: Walter J. Koinzan, Elgin, Nebr. 68636

[22] Filed: Aug. 30, 1973

[21] Appl. No.: 392,886

[52] U.S. Cl................. 239/177, 239/212, 137/344
[51] Int. Cl............................................. B05b 3/02
[58] Field of Search .......... 239/147, 159, 177, 212; 137/344

[56] References Cited
UNITED STATES PATENTS

| | | |
|---|---|---|
| 2,893,643 | 7/1959 | Gordon............................ 137/344 |
| 3,381,893 | 5/1968 | Smith et al...................... 137/344 X |
| 3,446,434 | 5/1969 | Smith et al........................... 239/212 |
| 3,623,663 | 11/1971 | Koinzan.............................. 239/177 |

Primary Examiner—Robert S. Ward, Jr.
Attorney, Agent, or Firm—Clarence A. O'Brien; Harvey B. Jacobson

[57] ABSTRACT

A control system for traveling field irrigation equipment incorporating winch and cable means for selectively operating valves associated with a series of oppositely directed water hoses for selectively powering water motors for the driving of the irrigation equipment.

7 Claims, 5 Drawing Figures

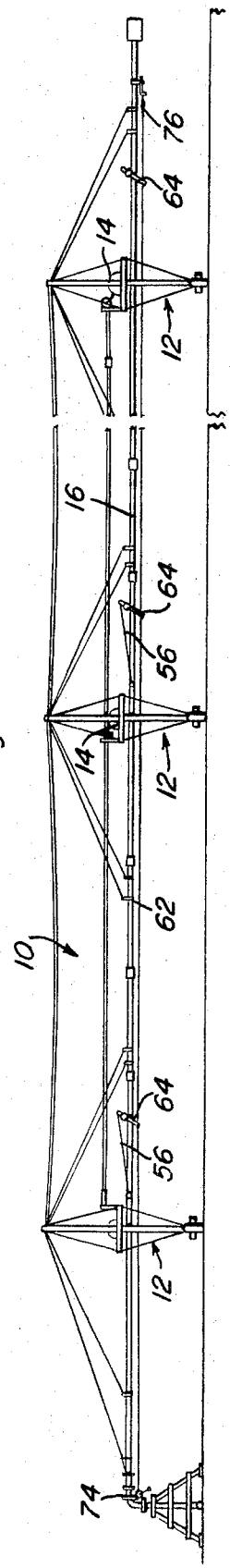
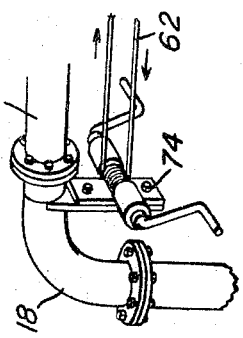
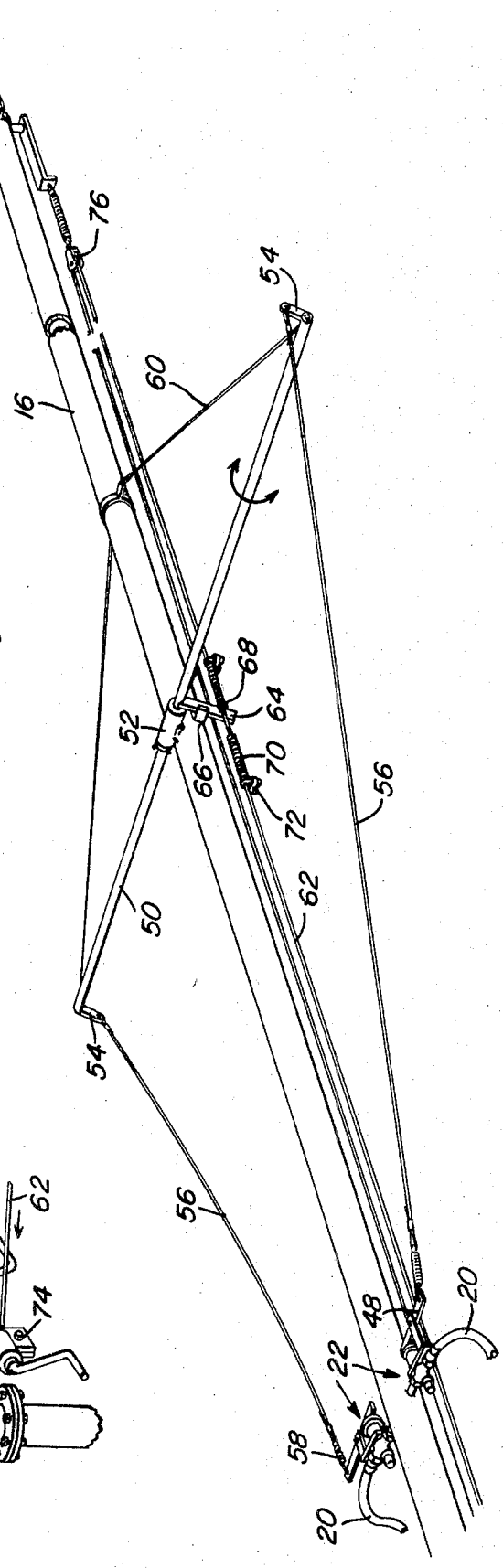
Fig. 1
Fig. 2
Fig. 5

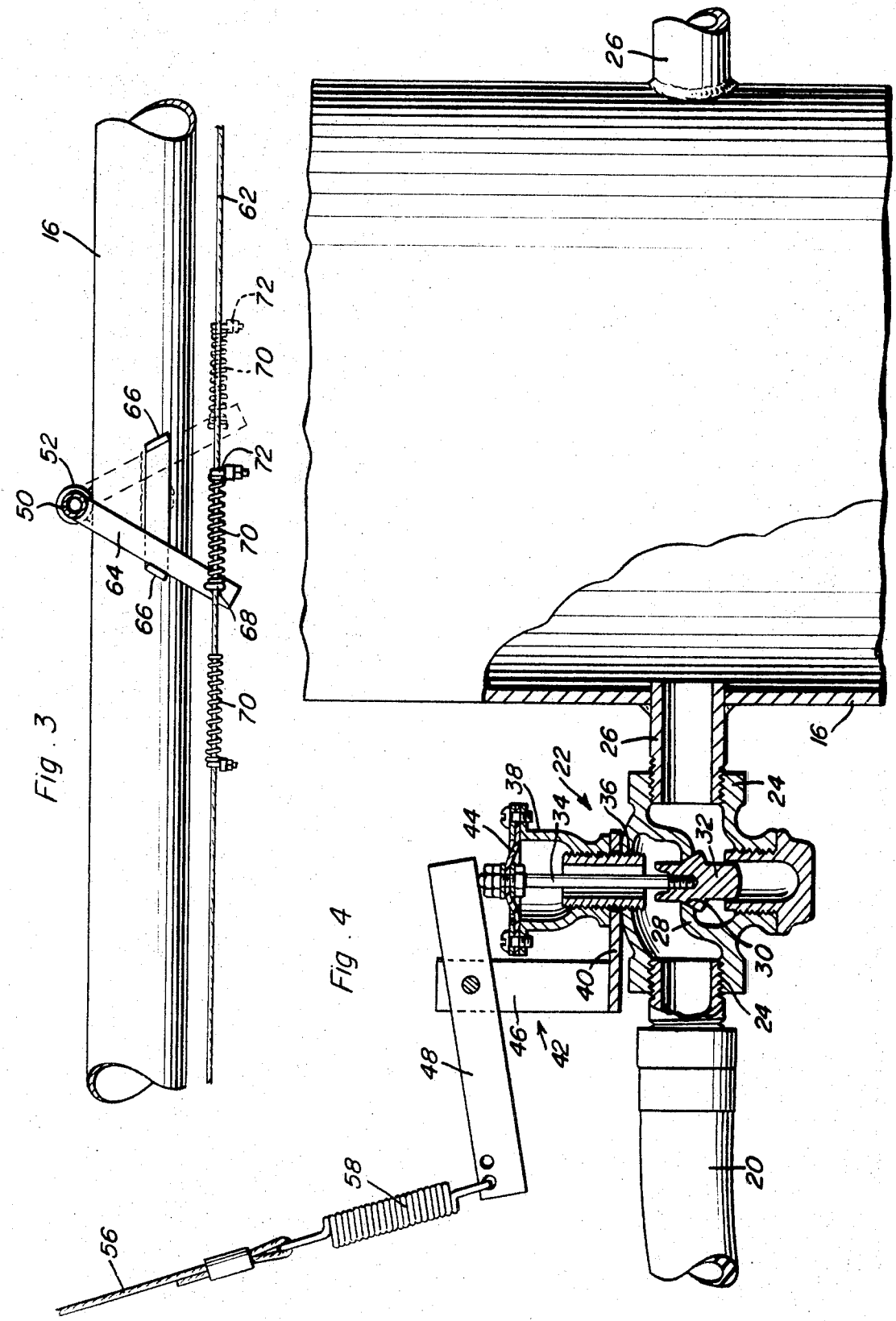

DIRECTION CONTROL SYSTEM WITH LEVER VALVE CONTROL

The present invention is generally concerned with traveling field irrigation equipment of the type shown in U.S. Pat. No. 3,623,663, and more particularly relates to a unique control system for selectively directing the equipment propelling water in either of two directions whereby a driving of the equipment either clockwise or counterclockwise can be effected.

It is a primary object of the invention to provide a simplified trouble free control system for large field irrigation equipment of the type propelled by water motors responsive to a pressurized discharge with the direction of the discharge determining the direction of movement of the equipment.

Basically, a pair of water hoses are associated with each water motor with each hose being connected to the main supply pipe through a lever controlled quick-acting valve. A reversing bar is associated with each pair of valves and connected to the valve levers by appropriate tension cables. Each of the reversing bars is in turn controlled through a cable and manual winch whereby an actuation of the winch will effect, through the associated cable, a movement of each of the reversing bars and a selective operation of the associated pair of valves whereby one valve is closed and the other is opened. Utilizing this simple arrangement, multiple valve pairs can be simultaneously controlled. Each of the valves consists of a sealed unit with the valve stem mounted and operated through a flexible diaphragm selectively moved so as to open the valve through a cable control lever, and so as to close the valve through internal pressure, providing a valve which can provide dependable operation without fear of sticking or jamming regardless of any adverse conditions encountered over extended periods of field operation.

These together with other objects and advantages which will become subsequently apparent reside in the details of construction and operation as more fully hereinafter described and claimed, reference being had to the accompanying drawings forming a part hereof, wherein like numerals refer to like parts throughout.

FIG. 1 is a schematic illustration of field irrigation equipment incorporating the controls of the instant invention;

FIG. 2 is a perspective view of a portion of the main supply pipe with the equipment of the invention mounted thereon;

FIG. 3 is an enlarged elevational view of a portion of the control system;

FIG. 4 is a partial plan view of one of the valves, shown in section for purposes of illustration, mounted on the main water pipe; and FIG. 5 is a perspective detail of the standpipe mounted winch.

Referring now more specifically to the drawings, reference numeral 10 is used to generally designate field irrigation equipment of the type illustrated in U.S. Pat. No. 3,623,663, incorporating mobile towers 12 selectively propelled clockwise or counterclockwise by appropriate tower mounted water motors 14 operable in response to the flow of pressurized water tapped from the main water line or pipe 16 supported and carried by the towers 12. The main 16 is in turn appropriately connected to a swivel mounted water supplying standpipe 18.

The operation of each of the water motors 14 is effected, in its simplest form, by the discharge of water against a water wheel type device with the direction of discharge effecting the direction of rotation of the wheel and the direction of movement of the corresponding tower. As such, each wheel will normally have two oppositely directed discharge nozzle and hose units associated therewith. For purposes of this disclosure, only the hoses 20 have been illustrated with each hose 20 communicated with the main water pipe 16 through an appropriate valve unit 22.

With reference to FIG. 4 in particular, the valve member 22 has opposed internally threaded ends 24, one of which threads on a relatively short pipe section 26 communicating with the interior of the main 16, and the other of which threadedly receives one end of the water hose 20. A transverse wall 28 spans the interior of the valve unit between the end of the hose 20 and the pipe section 26 with this wall having a water flow passage 30 therethrough, the peripheral edge of which forms a valve seat for a reciprocating valve member 32. An elongated valve stem 34 is affixed to the valve member 32 and projects through an elongated pipe nipple 36 threaded within an internally threaded hole tapped through the body of the valve unit 22. An enlarged housing 38 is threaded on the external portion of the pipe nipple 36 and clamps one leg 40 of a mounting bracket 42 against the body of the valve unit 22. A flexible diaphragm 44 is mounted over and seals the enlarged outer open end of the housing 38 with the valve stem 34 being centrally affixed to the diaphragm 44 whereby a flexing of the diaphragm 44 will effect a corresponding movement of the valve stem 38 and a selective opening and closing movement of the valve member 32.

The bracket 42 includes a second leg 46 extending at right angles to the first leg 40 to a point outward of the diaphragm mounted end of the valve stem 30. A control lever 48 is pivotally mounted to the outer portion of the bracket leg 46 and includes a first end engaged with the outer end of the valve stem 34 and a second end engaged by the control equipment to be subsequently described. In operation, the valve unit 22 is opened by an inward pivoting of the first end of the control lever 48 so as to bear against the outer end of the valve stem 34 and effect an inward flexing of the diaphragm 44 and a movement of the valve member 32 away from its seat, allowing the passage of the pressurized water from the main pipe 16 through the valve unit 22 and the water motor associated hose 20. Upon a swinging of the stem engaged end of the lever 48 outward, the internal water pressure on the diaphragm 44 will effect an outward flexing of the diaphragm and a closing of the valve. The continued pressure of the water on the inner end of the valve member 32 will maintain the valve closed until the control lever 44 is again forcibly pivoted so as to move the valve stem 34 and valve member 32 against the internal water pressure so as to unseat the valve member and open the valve. As will be appreciated from FIG. 4, the pipe nipple 36 is substantially larger than the valve stem 34 to preclude any possiblity of the stem sticking due to accumulating sand and foreign material within the water itself. Also, the substantial clearance provided between the nipple and the stem allows for free flow of the water to and away from the diaphragm 44.

The two valves, and water directing hoses 20, associated with each power mounted water motor are controlled in a manner whereby one valve opens as the other valve closes, providing in effect an instantaneous reversal of the drive. In order to effect this control, a transverse reversing bar 50 is rotatably received through a bearing 52 fixed to the main water pipe 16 outward of each involved pair of valves 22. Each end of the reversing bar is provided with a radially extending control arm 54, the two arms 54 extending in generally diametrically opposed directions. An elongated valve cable 56 extends from the outer end of each control arm 54 to the outer end of the valve lever 48 of one of the valves 22, the engagement of the valve cable 56 with its corresponding valve 22 being through a coiled tension spring 58. This spring 58, constituting in effect a portion of the valve cable, provides for a positive snap-acting of the valve and a complete opening and closing thereof. Further, the oppositely directed extension of the control arms 54 provides for a positive opening of one valve unit 22 simultaneously with a closing of the second valve unit 22. The orientation of the reversing bar 50, valve cables 56 and valve units 22 will be best appreciated from FIG. 2 of the drawings. If deemed desirable, appropriate brace cables 60 can be utilized to stabilize the reversing bar 50. Incidentally, as detailed previously, it will be appreciated that the closing of a valve unit 22 is effected by the internal water pressure upon a release of the force on the associated valve lever 48 which in turn is effected by a slight slacking of the associated valve cable 56.

The actual manipulation of the reversing bar 50 is effected through a winch cable 62 which engages a radially extending handle 64 fixed to the reversing bar 50 immediately adjacent the main pipe 16. A pair of stops 66 are provided on the pipe 16 and constitute the opposed limits of movement of the handle 64 corresponding to the two valve positions. The engagement of the winch cable 62 with the handle 64 is effected by the cable 62 passing through a ring or loop-like member 68 on the handle 64 with opposed expanded coil compression springs 70 having free inner ends engageable with the ring 68 and outer ends fixed to the cable by appropriate clamps 72. With this arrangement, the handle 64 is moved by an engagement against the ring of the free inner end of one of the springs 70 with the development of sufficient tension in the cable 62 effecting a swinging movement of the handle 64. At the same time, the corresponding spring 70 compresses slightly and provides an effective means for holding the handle 64 against the proper stop 66 regardless of any slight stretching in the cable.

The operation of the winch cable 62 is effected by an appropriate manually controlled winch 74 mounted on or immediately adjacent the standpipe 18 with the two cable runs extending along the main pipe 16 to a remote pulley 76 bracket and spring-mounted to the main pipe 16 beyond the outermost reversing bar 50 associated with the outermost valve controls. As will be appreciated, the described valve units and reversing bar controls will be provided in conjunction with each water motor 14, normally one such motor being mounted on each of the irrigation equipment towers 12. Arranged in the manner described, it will be appreciated that a synchronized operation of all of the water motors can be simply and positively effected with the cable mounted springs accommodating any slight variations which might develop over the relatively great length of the equipment 10. Incidentally, it will be appreciated that the two runs of the winch cable 62 are wound in opposite directions on the winch 74 whereby a turning of the winch in a first direction will tension one cable and operate the reversing bar in one direction, while a turning of the winch in the opposite direction will tension the second cable run and effect a reverse rotation of the reversing bar 50.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. For use in conjunction with water motor powered field irrigation equipment, a control system, said system comprising a main water pipe, a pair of hoses extending from said pipe, a valve connecting each hose to the pipe and controlling the flow of water from the pipe to the hose, means for selectively simultaneously opening either valve and closing the other valve, said hoses being adapted for operative engagement with a water motor so as to, in response to the selective opening and closing of the valves, effect a selective driving of the water motor in either of two directions, said means for selectively opening and closing the valves including a valve lever fixed to each valve and movable in one direction to effect an opening of the corresponding valve, each valve lever being movable in a second direction to effect a closing of the associated valve, a reversing member movably mounted on the pipe, said reversing member, in a first position thereof, having a first valve cable connected thereto and extending therefrom to a first valve lever in a moved position opening the associated valve, and a second valve cable connected to the reversing member and extending therefrom to the second valve lever in a moved position closing the corresponding valve, said reversing member being movable between said first position and a second position wherein the first valve cable effects a valve closing movement of the corresponding lever and the second valve cable effects a valve opening movement of the corresponding lever.

2. The system of claim 1 wherein said reversing member comprises an elongated rotatably mounted bar having oppositely projecting cable securing arms fixed at spaced points thereon, each of said valve cables being secured to one of said arms.

3. The system of claim 2 wherein said reversing bar includes a manipulating handle fixed thereto and projecting radially therefrom for a rotation of the bar and an alternating operation of the valves.

4. The system of claim 3 including reversible winch and cable means engaged with said manipulating handle for a controlled swinging thereof.

5. The system of claim 4 wherein said cable means parallels the main water pipe and operatively controls multiple reversing bars at spaced points along said pipe.

6. The system of claim 5 wherein each valve comprises an inlet, an outlet, a flow passage therebetween, a valve seat within said flow passage, a valve member selectively engageable within said valve seat for a closing of the flow passage, an elongated valve stem having one end affixed to said valve member, a flexible diaphragm fixed to the remote end of said valve stem and being exposed to the internal water pressure within said valve unit with internal water pressure effecting a constant biasing of the diaphragm outwardly into a valve member seating position, the associated valve lever engaging said diaphragm and effecting a selective inward movement of the diaphragm against the water pressure and an opening of the valve.

7. The system of claim 1 wherein each valve comprises an inlet, an outlet, a flow passage therebetween, a valve seat within said flow passage, a valve member selectively engageable within said valve seat for a closing of the flow passage, an elongated valve stem having one end affixed to said valve member, a flexible diaphragm fixed to the remote end of said valve stem and being exposed to the internal water pressure within said valve unit with internal water pressure effecting a constant biasing of the diaphragm outwardly into a valve member seating position, the associated valve lever engaging said diaphragm and effecting a selective inward movement of the diaphragm against the water pressure and an opening of the valve.

* * * * *